Aug. 3, 1954  R. ADELL  2,685,472
ORNAMENTAL EDGE PROTECTIVE MOLDING FOR AUTOMOBILE DOORS
Filed Aug. 10, 1953

INVENTOR.
ROBERT ADELL
BY
Gregory S. Dolgorukov
ATTORNEY.

Patented Aug. 3, 1954

2,685,472

UNITED STATES PATENT OFFICE 2,685,472

ORNAMENTAL EDGE PROTECTIVE MOLDING
FOR AUTOMOBILE DOORS

Robert Adell, Detroit, Mich.

Application August 10, 1953, Serial No. 373,109

1 Claim. (Cl. 296—44)

This invention relates to motor vehicle bodies and more particularly to such bodies in which the trailing edges of the swinging closures thereof, such as doors, are protected by ornamental and protective molding.

The present application is a continuation-in-part of my co-pending application Serial No. 280,297, filed on April 3, 1952 for Trim Molding; and, Serial No. 328,065, filed on December 26, 1952 for Automobile Body Construction.

It has been found by those skilled in the art that provision of said swinging closures results in a number of very difficult problems in this particular art, for some of which no adequate solution has yet been found in spite of numerous attempts and a great variety of expedients proposed. One of such problems is confronted in suspending such closures in their respective recesses in a body and fitting them therein in such a manner that in the closed position of the closure there is as little gap as possible, and no observable or noticeable difference in the width of the gap between the edges of the swinging closures and the adjacent edges of the body.

Those skilled in the art have also been confronted with another serious problem of body maintainence resulting from the well known susceptibility of the swinging edges of such closures to nicking. This difficulty is particularly serious in the case of doors.

My co-pending applications disclose the method and means whereby the above problem has been solved in its major part by the provision of an ornamental and protective molding on the trailing edges of such swinging closures, particularly doors. It was found, however, that in spite of the apparently large number of possibilities of securing or connecting such molding to such trailing edges, particularly trailing edges of the doors, many of such possibilities do not present successful solutions of the problem. For instance, it has been proposed to drill holes through the door edge for the passage of connectors, such as screws for holding the molding to such edge. Although such holes are covered by the molding after the latter is installed, drilling of the edges constitutes an irreparable change in the automobile body clearly apparent from the outside thereof if the molding is removed, and, therefore, objectionable for this reason. In the attempts to connect the molding to the door edge by causing such molding to grip the edge of the door, it was found that unless the gripping action of the molding is sufficiently strong, the molding may slip off in use, due to its working itself off the edge because of the road vibrations and shocks caused by closing the door. On the other hand, making the molding sufficiently rigid in order to have a stronger gripping action, causes scratching and scuffing of the paint and thus damaging the door edge in applying the molding.

One of the objects of the present invention is to provide an improved molding and means for connecting the same to the door edge, particularly in original equipment, whereby the difficulties and disadvantages explained above are overcome and largely eliminated.

Another object of the present invention is to provide improved connecting means for securing an ornamental and trim molding to the trailing edge of an automobile door with the use of which said molding can be secured to the door structure positively and yet without making in the door such irreparable changes that would be apparent from the outside thereof if the molding is not installed on some automobiles, or should the molding be taken off after the automobile has been used for a certain period of time.

A still further object of the present invention is to provide improved means for connecting ornamental and trim molding to the trailing edge of an automobile door with the use of which the molding may be positively secured to the edge of any automobile on the assembly line in the plant, or be attached to said edge after the automobile has been in use for a certain period of time, and yet with means providing for such positive connection not being apparent from the outside of the vehicle and not detracting from the appearance of the automobile should the molding not be installed or taken off.

A still further object of the present invention is to provide improved connecting means of the foregoing character, which compensate for manufacturing variations in the body construction to which the molding is secured.

It is an added object of the present invention to provide an improved ornamental and protective molding of the nature specified above, which is simple in construction, dependable in use, is easy to apply and is relatively inexpensive to manufacture.

Further objects and advantages of this invention will be apparent from the following description and appended claim, reference being had to the accompanying drawings forming a part of this specification wherein like reference characters designate corresponding parts in the several views.

Figure 1:
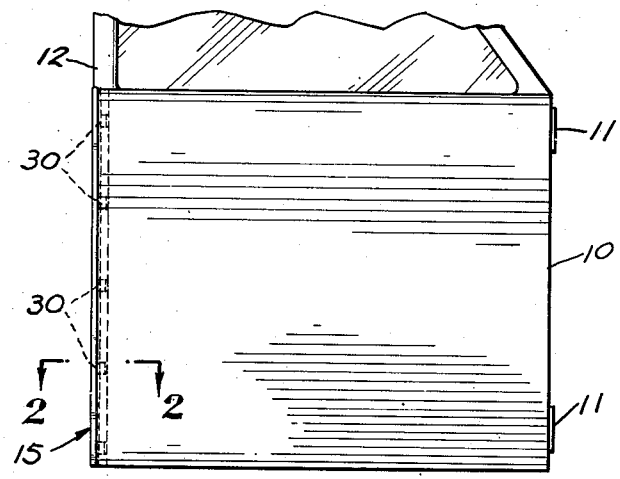
Fig. 1 is an elevational fragmentary view of an automobile body, particularly the door thereof, showing the ornamental molding applied to the trailing edge of the said door.
Figure 2:
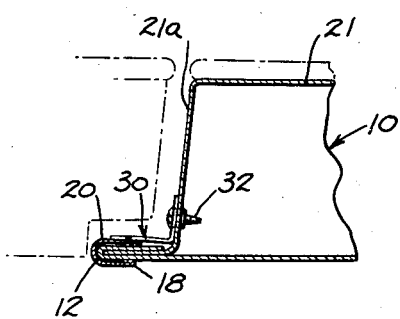
Fig. 2 is a sectional view taken in the direction of the arrows on a section plane passing through the line 2—2 of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention I provide an ornamental molding of a relatively rigid and stable character and of a U-shape cross section, adapted to embrace the trailing edge of the door. The legs of the U cross section are open to permit passage of a door edge with manufacturing variations thereof being at their average.

With such a construction, should the manufacturing variations add up to produce an edge of maximum thickness, the molding will go on such an edge with a gripping action. On the other hand, should manufacturing variations add up to produce the edge of minimum thicknesses, the gripping action on such edge will be very light, if any. In other words, I do not depend upon the molding itself for its retention in place.

In accordance with the invention I provide a plurality of attaching brackets secured to the molding at the inner leg of the U-shape cross section in any suitable manner, preferably by spot welding or by riveting. The bracket is preferably of angular construction and is adapted to fit within the corner formed between the protruding trailing edge and the inner sheet of the door structure. The other leg of the bracket is adapted to be positively secured to such transversely extending sheet in a suitable manner, such for instance, as with the aid of a tapping screw. The dimensions of the bracket are so selected that when it is attached to the door with the tapping screw engaging the door at the pre-punched holes, the molding will be properly positioned on the door edge.

In accordance with the invention holes adapted to receive the tapping screws or other stamping connections such as rivets, bolts, and the like, are punched in the door structure of every automobile, enabling installation of my improved molding on any automobile on the assembly line. It will be understood that such holes are relatively small and when the door is painted they are covered by the paint, leaving only slight depressions on the transversely extending portion of the inner sheet of the door, which depressions are, however, clearly noticeable to an experienced eye. Thus, when the molding is being installed the sharp tapping screws easily penetrate and break the layer of paint tapping the sides of the opening. Obviously, the paint may be pierced with an awl when such connectors as rivets or bolts are to be used.

The leg of the brackets which is engeged by the connector may be provided with an opening which is larger than the cross section of the stem of the connector, thereby compensating for manufacturing variations and also permitting adjusting of the bracket and, therefore, of the molding in the process of applying the same. Such opening may be in the form of a cross as disclosed herein.

Figure 3:
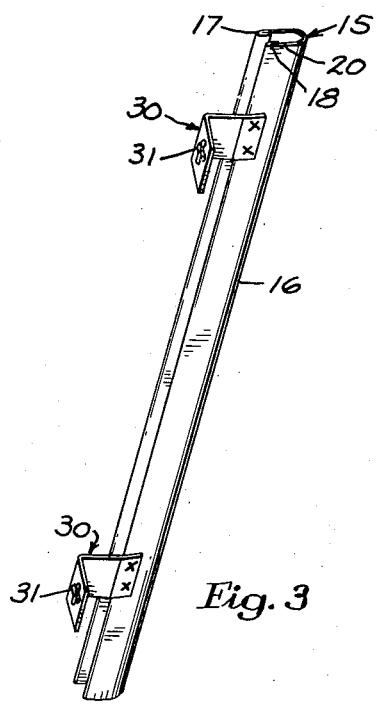
Fig. 3 is a perspective view of a portion of the molding shown separately.
Figure 4:
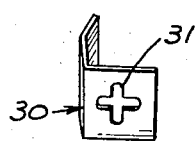
Fig. 4 is a perspective view showing separately and on an enlarged scale one of the angular attaching brackets.

Referring to the drawings, there is shown therein a door, generally designated by the numeral 10, which may be of any suitable construction. The door is hinged, as indicated at 11, in a manner well known in the art and has vertically extending trailing edge 12. The trim molding applied to the edge 12 is shown separately in Fig. 3 and is designated generally by the numeral 15. The molding 15 comprises a strip 16 of a suitable sheet material, such as stainless steel, bent substantially to a U-shape cross section with the ends of the legs of its U cross section being preferably bent upon themselves inwardly of the U, as shown at 17 and 18. Such an expedient increases the general stiffness or strength of the molding and produces round edges free of burrs or sharp edges that could otherwise be present in the molding and be undesirable for many reasons.

The inner leg 20 of the piece 16 has secured thereto, preferably by spot welding, a plurality of attaching brackets generally designated by the numeral 30. Brackets 30 are of angular construction with the angle thereof being selected to effect proper flat fit of the bracket against the transversely extending portion 21a of the inner sheet 21 of the door 10.

The portion 21a of the door sheet 21 has provided therein a plurality of punched holes arranged at predetermined localities and at distances from each other corresponding to those at which the brackets 30 are secured to the molding strip 16. The free leg of each bracket 30 is provided with an opening 31 through which the stem of a suitable connector, such as a tapping screw 32, may be passed. The opening 31 is of a larger area than the cross sectional area of the screw 32, in order to permit adjustments of the bracket with relation to the portion 21a to compensate for manufacturing variations in the door construction and to provide for adjustment of the molding on the door edge 12. I prefer to make said opening 31 of cross shape, thereby permitting moving the bracket on the screw in four directions and yet enable the head of the screw to hold the bracket down to the door without the necessity of providing a washer. It will be understood, however, that the opening 31 may be made of other shapes such, for instance, as of round shape, in which case a washer of a larger diameter than such opening may be used under the head of the screw.

It should also be understood that the brackets 30 may be bent or unbent in the process of applying the molding to the door edge, if such bending or unbending is necessary. If the bracket is riveted to the strip, it may also be rotated through a certain angle on such hinge, providing additional means for adjustment.

It will now be seen in view of the foregoing that automobile bodies may be made for each and every door thereof or other closures, such as engine hood and rear deck lid, to be provided along their trailing edges with holes for attaching my improved molding. However, if for any reason attachment of such molding is not desired, nothing further need be done to such particular door. On the other hand, should attaching the molding become desired after a certain period of time, which may be years after the automobile was purchased, installation of the molding may be easily done without any special tools and by a person not having special experience.

The ornamental and protective molding disclosed herein is positively secured to the door and no shaking off or sliding off of such molding is possible. Moreover, once installed such molding remains in a proper alignment on the edge and requires no further attention. If for any reason removal of the molding becomes desired, the same may be easily removed by removing the screws. Thereupon, after cleaning of the edge which theretofore was covered by the molding, no further refinishing need be done to the edge. Moreover, the holes on the portion 21a of the inner door sheet will not be apparent from the outside of the vehicle and need not be covered.

By virtue of the above described construction, the objects of the present invention listed above and numerous additional advantages are attained.

I claim:

In an automobile body having a door hinged thereon, an ornamental and edge protective molding provided at least along a portion of the trailing edge of said door, said molding comprising a strip of sheet metal having a U-shaped cross section and fitted over the trailing edge of the door to embrace and cover said edge, a plurality of angular securing brackets each of them having one of its legs spot welded to said strip at the inner leg of the cross section thereof and its other leg provided with an opening and adjustably secured with the use of a stemmed connector to the door structure, said opening being larger than the cross section of the connector's stem and being of the cross shape.

References Cited in the file of this patent

UNITED STATES PATENTS

| Number | Name | Date |
|---|---|---|
| 2,034,342 | Hay | Mar. 17, 1936 |
| 2,146,090 | O'Rourke | Feb. 7, 1939 |
| 2,226,615 | Killen | Dec. 31, 1940 |
| 2,383,575 | Wernig | Aug. 28, 1945 |
| 2,539,539 | Hunt | Jan. 30, 1951 |